United States Patent [19]

Oda et al.

[11] Patent Number: 4,888,819
[45] Date of Patent: Dec. 19, 1989

[54] TELEVISION ON CHANNEL SELECTING APPARATUS WITH SEQUENTIAL SELECTION OF AUXILIARY SIGNAL SOURCE

[75] Inventors: Omasu Oda, Tokyo; Toshio Amano, Kanagawa, both of Japan

[73] Assignee: Sony Corporation, Tokyo, Japan

[21] Appl. No.: 199,249

[22] Filed: May 26, 1988

[30] Foreign Application Priority Data

May 28, 1987 [JP] Japan .................. 62-132391

[51] Int. Cl.$^4$ .............................................. H04B 1/16
[52] U.S. Cl. ............................... 358/192.1; 358/191.1; 358/194.1; 455/179
[58] Field of Search ............... 358/191.1, 192.1, 194.1, 358/190; 455/179, 185, 186

[56] References Cited

U.S. PATENT DOCUMENTS

| | | | |
|---|---|---|---|
| 3,942,121 | 3/1976 | Bell et al. ................... | 455/185 X |
| 3,979,680 | 9/1976 | Sakamoto .................... | 455/186 |
| 4,031,491 | 6/1977 | Sakamoto .................... | 455/185 X |
| 4,131,853 | 12/1978 | Dreiske ...................... | 455/185 X |
| 4,161,699 | 7/1979 | Tanaka ........................ | 455/185 |
| 4,173,737 | 11/1979 | Skerlos et al. ............. | 455/185 |
| 4,375,651 | 3/1983 | Templin et al. ............ | 358/191.1 |
| 4,484,218 | 11/1984 | Boland et al. .............. | 455/186 X |
| 4,525,866 | 6/1985 | Templin ...................... | 455/186 |
| 4,539,711 | 9/1985 | Harger ........................ | 358/194.1 X |
| 4,737,993 | 4/1988 | DeVilbiss .................... | 358/86 X |
| 4,763,195 | 8/1988 | Tults .......................... | 358/191.1 X |
| 4,774,511 | 9/1988 | Rumbolt et al. ........... | 358/194.1 X |

FOREIGN PATENT DOCUMENTS

| | | | |
|---|---|---|---|
| 54-59802 | 5/1979 | Japan .......................... | 455/179 |
| 54-104202 | 8/1979 | Japan .......................... | 455/179 |
| 58-172011 | 10/1983 | Japan .......................... | 455/179 |

Primary Examiner—James J. Groody
Assistant Examiner—Mark R. Powell
Attorney, Agent, or Firm—Hill, Van Santen, Steadman & Simpson

[57] ABSTRACT

A television on channel selecting apparatus arranged such that when two antenna inputs are switched, the switching operation for the second antenna input is included in the switching operation for the first antenna input, thus the channel-selection being carried out by a more simplified key operation.

14 Claims, 5 Drawing Sheets

TELEVISION ON CHANNEL SELECTING APPARATUS WITH SEQUENTIAL SELECTION OF AUXILIARY SIGNAL SOURCE

BACKGROUND OF THE INVENTION

1. Field of the Invention

The present invention relates generally to receiving apparatus and more particularly to a television on channel selecting apparatus in which the channel-selection can be carried out by a more simplified key operation.

2. Description of the Prior Art

The United States of America, for example, now employs a total of 125 channels for television broadcasting using general broadcast radio waves and CATV (cable television). The television receiver for receiving these television broadcasts is constructed as, for example, shown in FIG. 1. FIG. 1 is a block diagram of an overall circuit arrangement of this type of a conventional television receiver.

As FIG. 1 shows, a main antenna terminal 1 is connected to an antenna 51 which receives general television broadcast waves. The television broadcast waves received at the antenna 51 are supplied through the terminal 1 to a normal contact N of a switching circuit 3.

An auxiliary antenna terminal 2 is provided. This auxiliary antenna terminal 2 is connected with a tuner 53 for CATV and a CATV coaxial cable 52 is connected to the tuner 53 to supply therethrough CATV broadcast waves to the tuner 53. The tuner 53 selects, of the CATV broadcast signals, a broadcast signal on the channel according to the channel selection operation of a remote control commander (transmitter) 54. This signal is converted into a broadcast signal on a free channel of the general standard television broadcast channels, or example, channel 2. The converted signal is supplied through the terminal 2 to an auxiliary contact A of the switching circuit 3.

A control signal SW is generated from a microcomputer 10, which will be described later, to control the switching circuit 3 to select one of the broadcast signals supplied to the contacts N and A. The signal from the switching circuit 3 is supplied to a tuner circuit 4. The tuner circuit 4 is a preset-type electronic tuning tuner which selects the channel according to a channel selection signal CH from the microcomputer 10, and converts it into a video intermediate frequency signal.

The video intermediate frequency signal from the tuner circuit 4 is supplied through a video intermediate frequency amplifier 5 to a video detector circuit 6, from which the video signal is produced. This video signal is supplied to a video circuit or the recording system of a video tape recorder (VTR) though not shown.

The microcomputer 10 is employed for the channel selection and is connected with an antenna input change-over key 21, a channel-up key 22, a channel-down key 23, ten keys 24 and so on. As earlier noted, the microcomputer 10 produces data, i.e., the control signal SW and the channel selection signal CH. A receiving circuit 25 is provided to receive a remote control signal transmitted from an infrared type remote controller or commander 26. The commander 26 includes keys equivalent to, for example, the above-mentioned keys 21 to 24. The key output of the commander 26 is received by and supplied from the receiving circuit 25 to the microcomputer 10. To the microcomputer 10, is further connected light emitting diodes (LED) 27 which indicates the selected channel in a digital fashion.

A last-channel memory 11 is a last-condition memory which is connected to the microcomputer 10. The last-channel memory 11 is backed up though not shown so that when the power to the television receiver is turned off, the data in the memory 11 can be protected from being lost. In practice, the last-channel memory 11 is formed by a part of a random access memory (RAM) of the microcomputer 10.

The last-channel memory 11 when the power to the television receiver is turned off, stores the data CH of the channel selected by the tuner circuit 4 and the data SW indicative of the contact N or A selected by the switching circuit 3. When the television receiver is powered, the data SW and CH stored in the last-channel memory 11 are supplied to the switching circuit 3 and the tuner circuit 4. Thus, the channel selected until the power to the television receiver is turned off is again selected.

Upon channel-selection, the channel changed and the channel indication are effected as shown in FIG. 2.

Now, let it be assumed that the switching circuit 3 is connected to the contact N. Then, the broadcast signals received at the antenna 51 are supplied to the tuner circuit 4. If the channel-up key 22 is depressed, the data or signal CH is varied. Each time the channel-up key 22 is depressed, the tuner circuit 4 selects the next higher channel. If the channel-up key 22 is pressed continuously, for example, for more than 0.4 second, channel selection is made sequentially upward at a constant time interval. After selection of channel 125, channel 1 is next selected, thus all channels cyclically selected upward.

If the channel-down key 23 is depressed, or each time the down-key 23 is depressed, the next lower channel is selected, and if the key is continuously depressed, channel selection is made to progress downward. After channel 1 is reached, channel 125 begins, thus all channels cyclically selected downward.

When a desired channel number is inputted by the ten keys 24, the corresponding channel is directly selected in accordance with the channel selection signal CH. FIG. 2 shows the case in which while the channel 123 is being received, channel 6 is selected by the ten keys 24.

Accordingly, when the switching circuit 3 is in the contact N position, an arbitrary channel of the general television broadcast channels can be selected.

Meanwhile, if the output channel of the tuner 53, or channel 2 in that case, is selected by any one of the keys 22 to 24 and the change-over key 21 is depressed, the switching control signal SW controls the switching circuit 3 to be changed to the opposite position, i.e., from the contact N position to the contact A position, thus allowing the broadcast signals from the tuner 53 to be supplied to the tuner circuit 4. Thus, a desired channel of CATV broadcast can be selected by the operation of the commander 54.

If the change-over key 21 is further depressed, the switching control signal SW controls the switching circuit 3 to be changed to the opposite position in which the general television broadcasts can be received as described above. In this way, the above-mentioned television receiver can select any one of the general television broadcast channels and the CATV broadcast channels.

In the above-mentioned television receiver, however, when switching is made from general television broadcast to CATV broadcast, the switching circuit 3 is required to be controlled by the key 21 to change in position and the tuner circuit 4 must be controlled to receive the output channel of the tuner 53 by operating any one of the keys 22 to 24. Thus, the operation is cumbersome.

Also, in order to change the CATV broadcast into the general television broadcast upon reception, keys must be operated in like a manner and hence, the cumbersome key operation cannot be avoided.

OBJECTS AND SUMMARY OF THE INVENTION

Accordingly, it is an object of the present invention to provide a television receiver improved in channel selecting operation.

It is another object of the present invention to provide a television receiver in which standard television broadcast channels and CATV (cable television) channels can be switched by a simple key operation.

It is a further object of the present invention to provide a television receiver in which the channel selection can be carried out positively.

It is yet a further object of the present invention to provide a television receiver in which a desired channel can be directly selected from auxiliary channels by ten keys.

According to an aspect of the present invention, there is provided a television on channel selecting apparatus comprising:

(a) first signal input means;
(b) second signal input means;
(c) switching means for switching an output of said first signal input means and an output of said second signal input means;
(d) selecting means for selecting a signal on a desired channel from one of the outputs of said first and second signal input means switched by said switching means; and
(e) control signal generating means for supplying a channel selection signal to said selecting means, wherein said control signal generating means includes a routine for sequentially selecting channels from said first signal input means and said routine includes a switching mode for supplying a switching signal to said switching means.

The above and other objects, features and advantages of the present invention will become apparent from the following detailed description of the preferred embodiment to be taken in conjunction with the accompanying drawings, in which like reference numerals identify like elements and parts.

DETAILED DESCRIPTION OF THE PREFERRED EMBODIMENT

Figure 1:
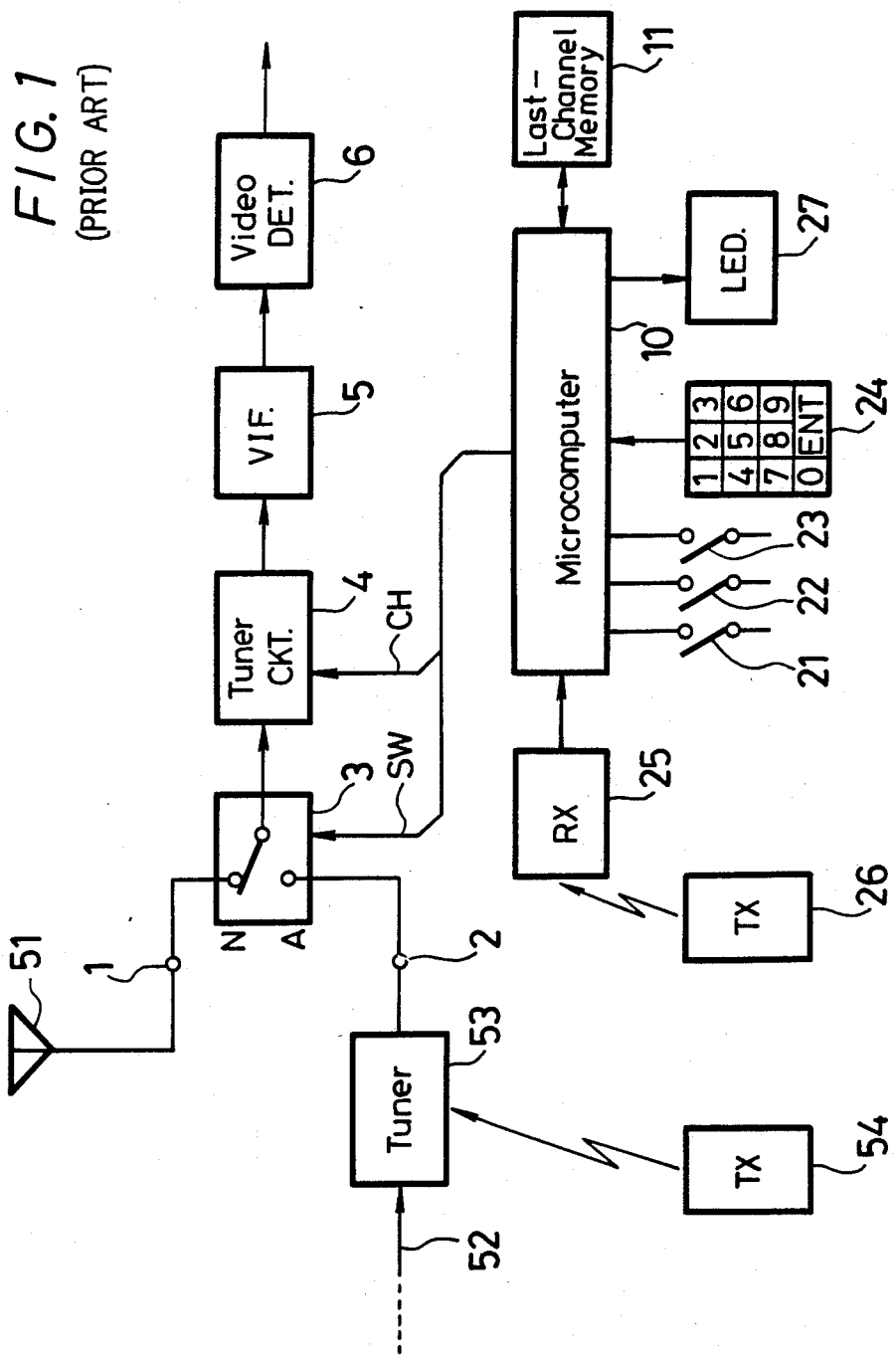
FIG. 1 is a block diagram showing an overall circuit arrangement of a conventional television receiver.
Figure 2:
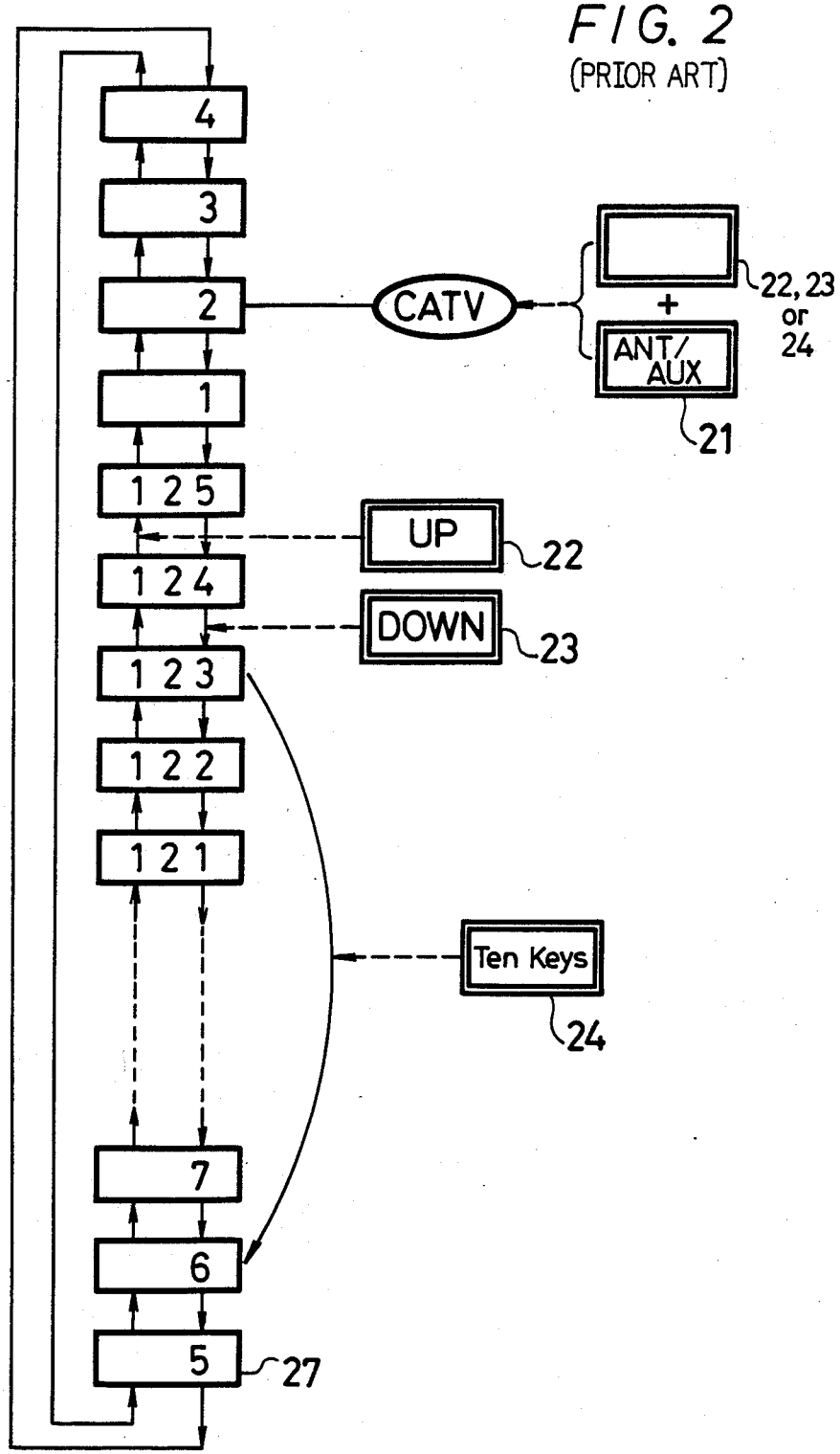
FIG. 2 is a schematic representation illustrating how the channel is changed by depressing keys.
Figure 3:
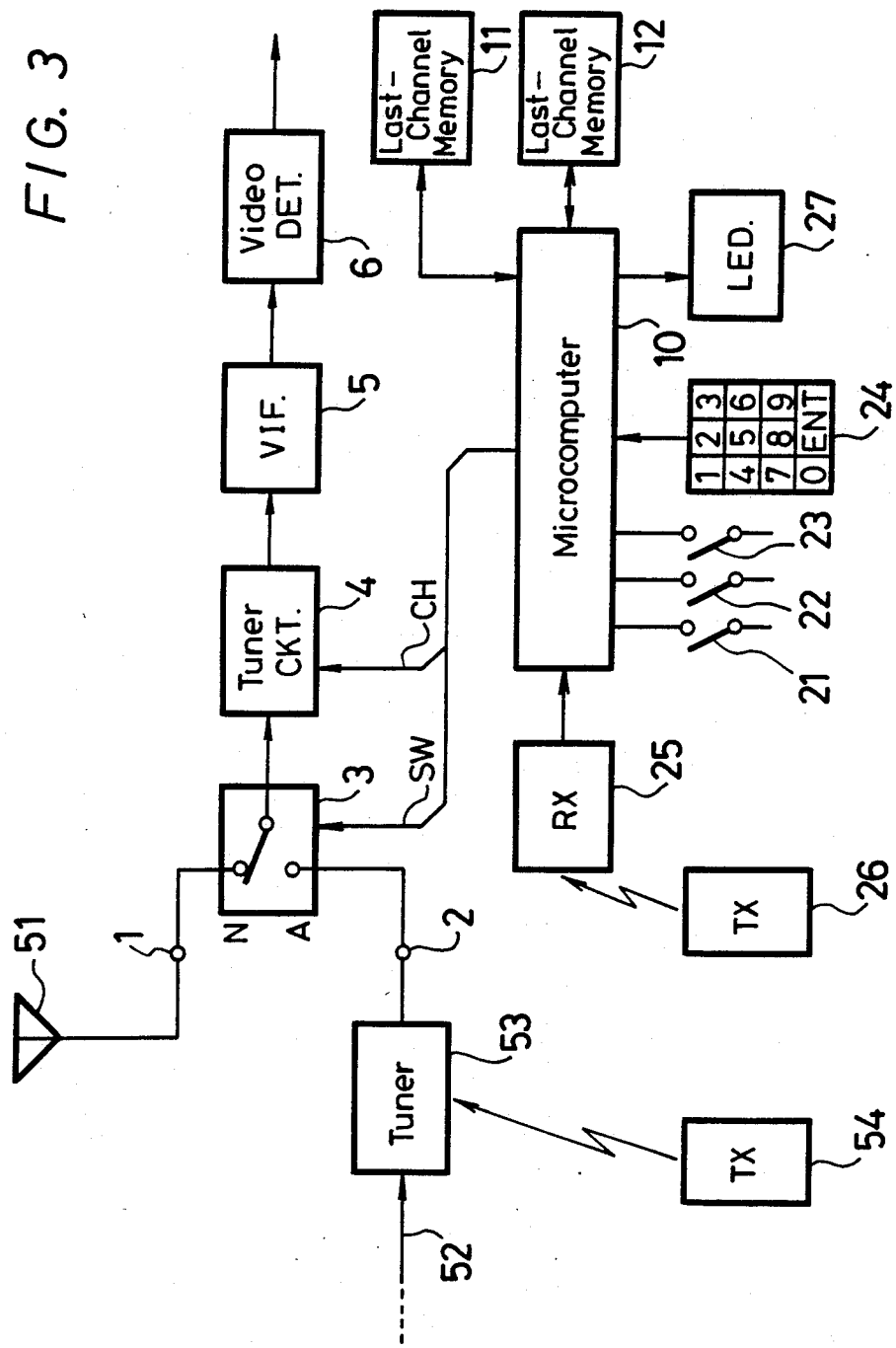
FIG. 3 is a block diagram showing an overall circuit arrangement of an embodiment of a television receiver according to the present invention.

An embodiment of a television receiver according to the present invention will now be described in detail with reference to the drawings. FIG. 3 illustrates an overall circuit arrangement of the invention, and in FIG. 3, like parts corresponding to those of FIG. 1 are marked with the same references and will not be described in detail.

Referring to FIG. 3, there is provided a memory 12. The memory 12 is connected to the microcomputer 10 and is though not shown backed up so that its stored data can be protected from being lost when the power to the television receiver is turned off. In practice, the memory 12 is formed by a part of the RAM of the microcomputer 10 as is the memory 11.

The data CH and SW are accessed by the memory 12. When the change-over key 21 is depressed, the data CH and SW stored in the memory 12 are interchanged with data (signals) CH and SW which have been supplied to the switching circuit 3 and the tuner circuit 4.

In this embodiment, the tuner circuit 4 can select 126 channels one channel more than before. Also, a channel for reception equal to the output channel of the tuner 53 is provided (preset) between channel 1 and channel 125 and this channel when received is indicated as, for example, "AUX" on the LEDs 27. This channel will be referred to as "AUX channel" hereinbelow.

Further, a program is set in the microcomputer 10 so that when the tuner circuit 4 selects the AUX channel, the signal SW controls the switching circuit 3 to be changed to the contact A position, while when it selects one of the channels 1 to 125, the switching circuit 3 is changed to the contact N position.

Figure 4:
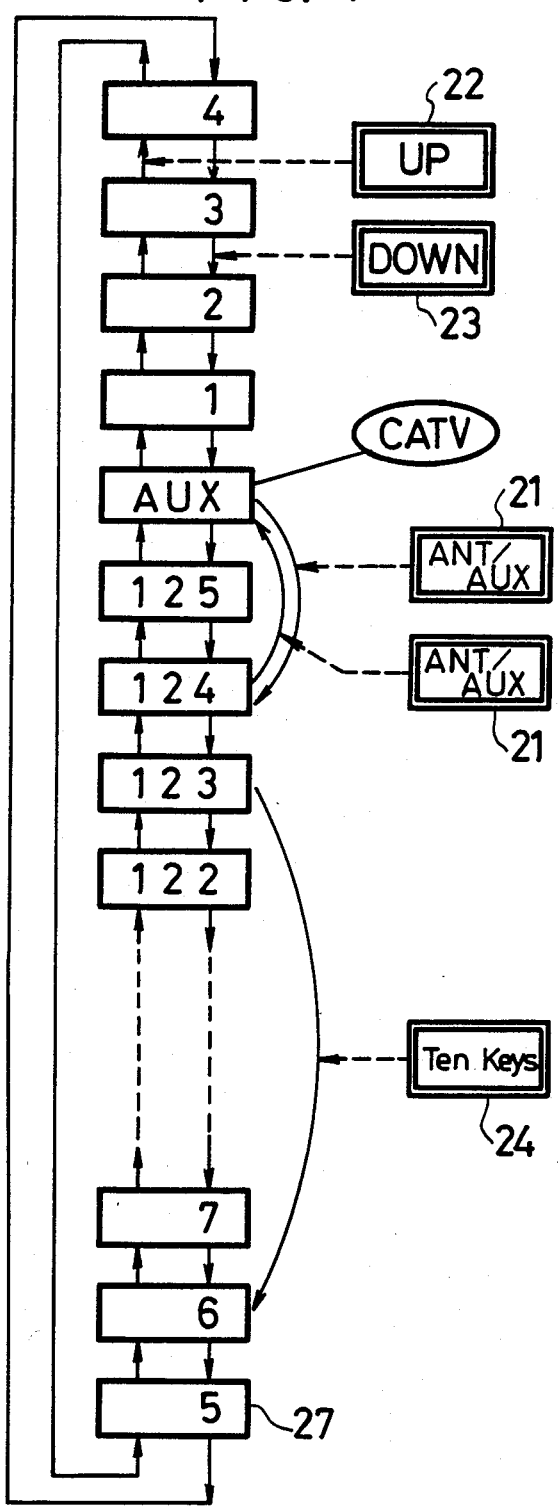
FIG. 4 is a schematic representation illustrating how the channel is changed by depressing keys in the present invention.

According to the arrangement, upon channel-selection, the channel selection and the indication on the LED 27 are controlled by the microcomputer 10 as shown in FIG. 4.

As FIG. 4 shows, when the channel-up key 22 or channel-down key 23 is depressed, the channel to be selected by the tuner circuit 4 is changed on the basis of the signal CH similarly as described above. At that time, if the selected channel is one of the channels 1 to 125 for the general television broadcasting, the switching circuit 3 is changed to the contact N position by the signal SW. Therefore, of the channels 1 to 125 for the general television broadcasting, any channel can be selected by operating the key 22 or 23 and the video signal thereon can be displayed.

If the channel-up key 22 is depressed once or pressed continuously under the state that the channel 125 of the general television broadcast channels is selected, the signal CH controls the output channel of the tuner 53 to be selected by the tuner circuit 4 and the signal SW controls the switching circuit 3 to be changed to the contact A position, thus enabling the viewer to watch the CATV broadcast selected by the tuner 53. The LED 27, at that time, indicates "AUX" for the CATV broadcast.

If the channel-up key 22 is depressed once or continuously pressed under the state that the CATV broadcast channel (AUX channel) is selected, the signal CH controls the tuner circuit 4 to select the channel 1 and also, the signal SW controls the switching circuit 3 to be changed to the contact N position, thus enabling channel 1 of the general television broadcast channels to be selected again or a succeeding channel to be selected.

If the channel-down key 23 is depressed once or pressed continuously under the condition that the channel 1 of the general television broadcast channels is selected, the signal CH controls the output channel of the tuner 53 to be selected by the tuner circuit 4, and also, the signal SW controls the switching circuit 3 to be changed to the contact A position, thus enabling the viewer to watch the CATV broadcast selected by the tuner 53.

If the channel-down key 23 is depressed once or continuously pressed under the state that the CATV broadcast channel (AUX channel) is selected, the signal CH causes the tuner circuit 4 to select the channel 125 and the signal SW causes the switching circuit 3 to be changed to the contact N position. Thus, the channel 125 of the general television broadcast channels can he selected again or the preceding channel can be selected.

Accordingly, when the channel-up key 22 or channel-down key 23 is depressed, as shown in FIG. 4, the channels 1 to 125 for the general television broadcast and the CATV broadcast channel selected by the tuner 53 can be cyclically scanned up or so that any one channel can be selected.

Figure 5:
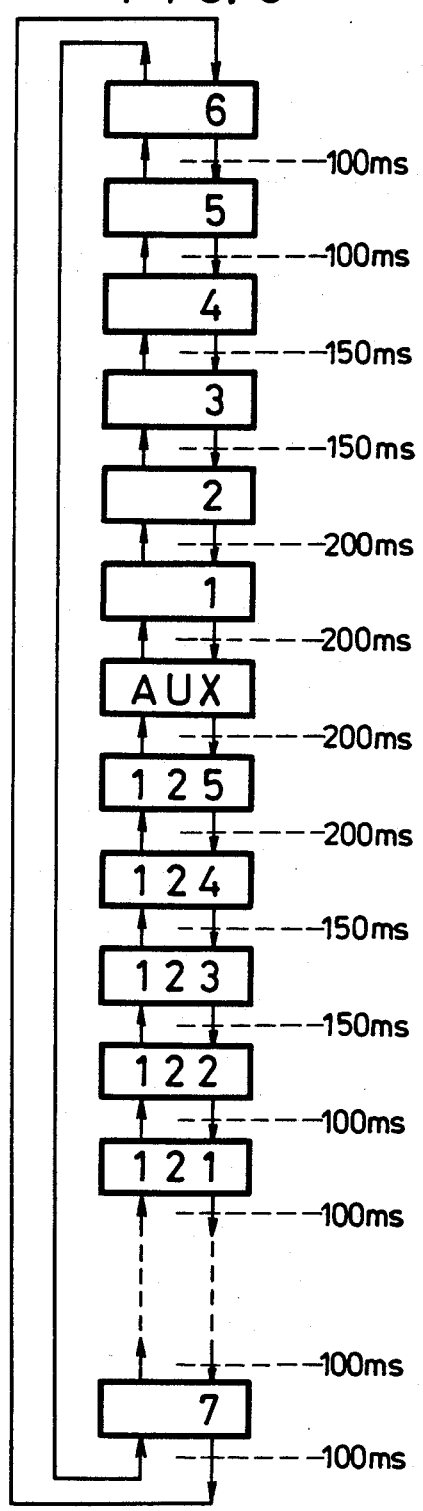
FIG. 5 is an illustration used to explain the operation of the present invention.

When channel selection is cyclically made by depressing the channel-up 22 key or channel-down key 23, as illustrated in FIG. 5, the scanning speed slows down in the vicinity of the AUX channel (CATV broadcast), so that when the LED 27 indicates "AUX", the viewer can watch it without fail.

Let it be considered that an arbitrary number channel of general television broadcast is inputted by operating the ten keys 24. For example, when the number [6] is inputted by operating the ten keys 24 under the state that a program on the channel number 123 is being viewed as, for example, shown in FIG. 4, the signal CH controls the tuner circuit 4 to select the channel 6.

Further, when the change-over key 21 is depressed under the state that a program on the AUX channel (CATV broadcasting) is being viewed, the data SW and CH stored in the memory 12 are interchanged with the signals (data) SW and CH which are being supplied to the switching circuit 3 and the tuner circuit 4. If a program on a general television broadcast channel, for example, channel 124 has been viewed before the AUX channel is selected, the channel-selection data SW and CH associated with the channel 124 are stored in the memory 12, and the data SW and CH stored in the memory 12 are interchanged with the data SW and CH supplied to the switching circuit 3 and the tuner circuit 4. Thus, the data SW and CH used for selecting the channel 124 of general television broadcast are supplied to the circuits 3 and 4, and the data SW and CH for selecting the AUX channel are stored in the memory 12.

Therefore, as shown in FIG. 4, change is made from the AUX channel to the channel 124 by depressing the key 21.

When the key 21 is depressed under the state that a program on any channel of the general television broadcast channels, for example, the channel 124 is viewed, similarly as described above, the data SW and CH stored in the memory 12 are interchanged with the data SW and CH which are now being supplied to the circuits 3 and 4. Thus, the AUX channel is selected on the basis of the data SW and CH stored in the memory 12, and the last condition in which the channel 124 has been received and reproduced is stored in the memory 12. Thus, each time the change-over key 21 is depressed, the CATV broadcasting channel and a general television broadcasting channel viewed so far can be switched.

According to present invention, as set forth above, since the AUX channel is provided between the channel 1 and the channel 125 and at this AUX channel the signal SW causes the switching circuit 3 to be changed to the CATV tuner 53 side position and the signal CH causes the tuner circuit 4 to select the output channel of the tuner 53, the CATV broadcasts can be received and reproduced only by operating the channel-up key 22 or the channel-down key 23. In other words, the CATV broadcasts can be received and reproduced as one of the general television broadcasting channels. This makes the operation very easy.

When the channel scanning is made continuously by operating the channel-up key 22 or the channel-down key 23, the channel numbers from channel 1 to channel 125 are scanned successively so that any channel to be selected can be watched, without fail and channels near AUX channel are scanned slowly so that when a desired channel is the AUX channel, it can be selected accurately.

Further, when the key 21 is depressed, a general television broadcasting channel which has been viewed and the AUX channel are switched at every operation of the key 21. Thus, when the key 21 is depressed once under the condition that a program on a general television broadcasting channel is being viewed, the CATV broadcasting can be watched, and thus the key operation is very simplified.

Figure 6:
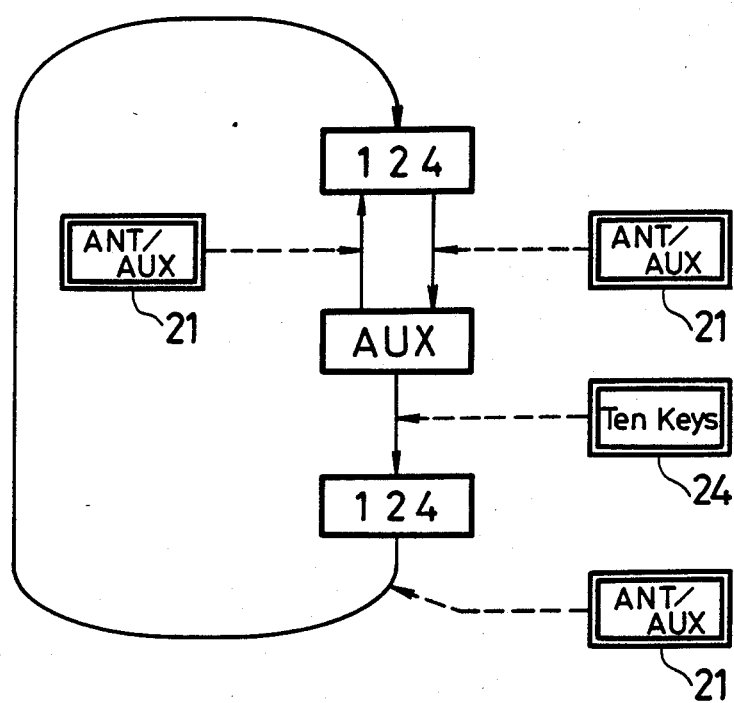
FIG. 6 is a schematic representation for explaining how the channel is changed by operating keys in the present invention.

In addition, when some user does not connect the tuner 53 to the antenna terminal 2 but connects the antenna 51 or an auxiliary antenna to the antenna terminal 2, the channel switching and indication are made by operating the keys 21 and 24 as shown in FIG. 6. Thus, from the AUX channel, a desired channel can be directly switched to by operating the ten keys 24. In the case of FIG. 6, a general broadcast is received and reproduced through the channel 124.

The above description is presented by way of example on a single preferred embodiment of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. A television on-channel selecting apparatus comprising:
   (a) first signal input means for receiving signals from a first broadcasting system;
   (b) second signal input means for receiving signals from a second broadcasting system;
   (c) first tuner means for tuning a plurality of channels of said first broadcasting system and an auxiliary channel;
   (d) second tuner means for tuning a plurality of channels of said second broadcasting system and for outputting a signal on said auxiliary channel;
   (e) switching means connected to receive an output of said first signal input means and an output of said second tuner means and for providing an output to said first tuner means;

(f) key means for controlling said first tuner means to sequentially select said plurality of channel of said first broadcasting system and said auxiliary channel;

(g) indicating means responsive to said first tuner means for indicating a selected one of said plurality of channels of said first broadcasting system as numerals, and said auxiliary channel, when selected, as a non-numeral character;

(h) control signal generating means connected to said key means and to said first tuner means for supplying channel selection signals to said first tuner means and switching signals to said switching means, said control signal generating means causing said first tuner means to sequentially select channels of said first broadcasting system by keys corresponding to said numerals and said non-numeral character, and said control signal generating means supplying a switching signal for automatically selecting the output of said second tuner for connection to said first tuner only when said auxiliary channel is selected.

2. A television on channel selecting apparatus as claimed in claim 1, wherein said control signal generating means is a microcomputer.

3. A television on channel selecting apparatus as claimed in claim 1 or 2, wherein said first signal input means is supplied with standard television broadcast signals.

4. A television on channel selecting apparatus as claimed in claim 1 or 2, wherein said second signal input means is supplied with other video signals.

5. A television on channel selecting apparatus as claimed in claim 4, wherein said other video signals are cable television broadcast signals.

6. A television on channel selecting apparatus as claimed in claim 1 or 2, wherein said selecting means is a tuner.

7. A television on channel selecting apparatus according to claim 1, wherein said indicating means includes means for indicating a channel selected by said selecting means.

8. A television on channel selecting apparatus as claimed in claim 7, wherein said switching mode is indicated as an auxiliary channel of said selecting means by said indicating means.

9. A television on channel selecting apparatus as claimed in claim 1 or 2, wherein said indicated numeral is sequentially changed by a channel-up key or a channel-down key.

10. A television on channel selecting apparatus as claimed in claim 9, wherein said channel-up key or channel-down key enables said selecting means to continuously carry out sequential selecting of said channel.

11. A television on channel selecting apparatus as claimed in claim 1, wherein said selection operation is effected by use of ten keys.

12. A television on channel selecting apparatus according to claim 1 or 2, further comprising a switching key for switching said switching mode and said channel.

13. A television on channel selecting apparatus according to claim 12, further comprising a memory for storing data of a channel received just before said switching key is operated and control means for controlling said selecting means to select the channel stored in said memory when said switching key is again operated.

14. A television on channel selecting apparatus comprising:

(a) first signal input means;

(b) second signal input means;

(c) switching means for switching an output of said first signal input means and an output of said second signal input means;

(d) selecting means for selecting a signal on a desired channel from one of the outputs of said first and second signal input means switched by said switching means; and (e) control signal generating means for supplying a channel selection signal to said selecting means, wherein said control signal generating means includes a routine for sequentially selecting channels from said first signal input means and said routine includes a switching mode for supplying a switching signal to said switching means, wherein the operation of said switching means is carried out continuously and sequentially, and said selecting is made at a slower speed in the vicinity of a predetermined switching mode.

* * * * *